Oct. 13, 1942.  E. W. STACEY  2,298,430
TRIMMING MACHINE
Filed Oct. 18, 1940
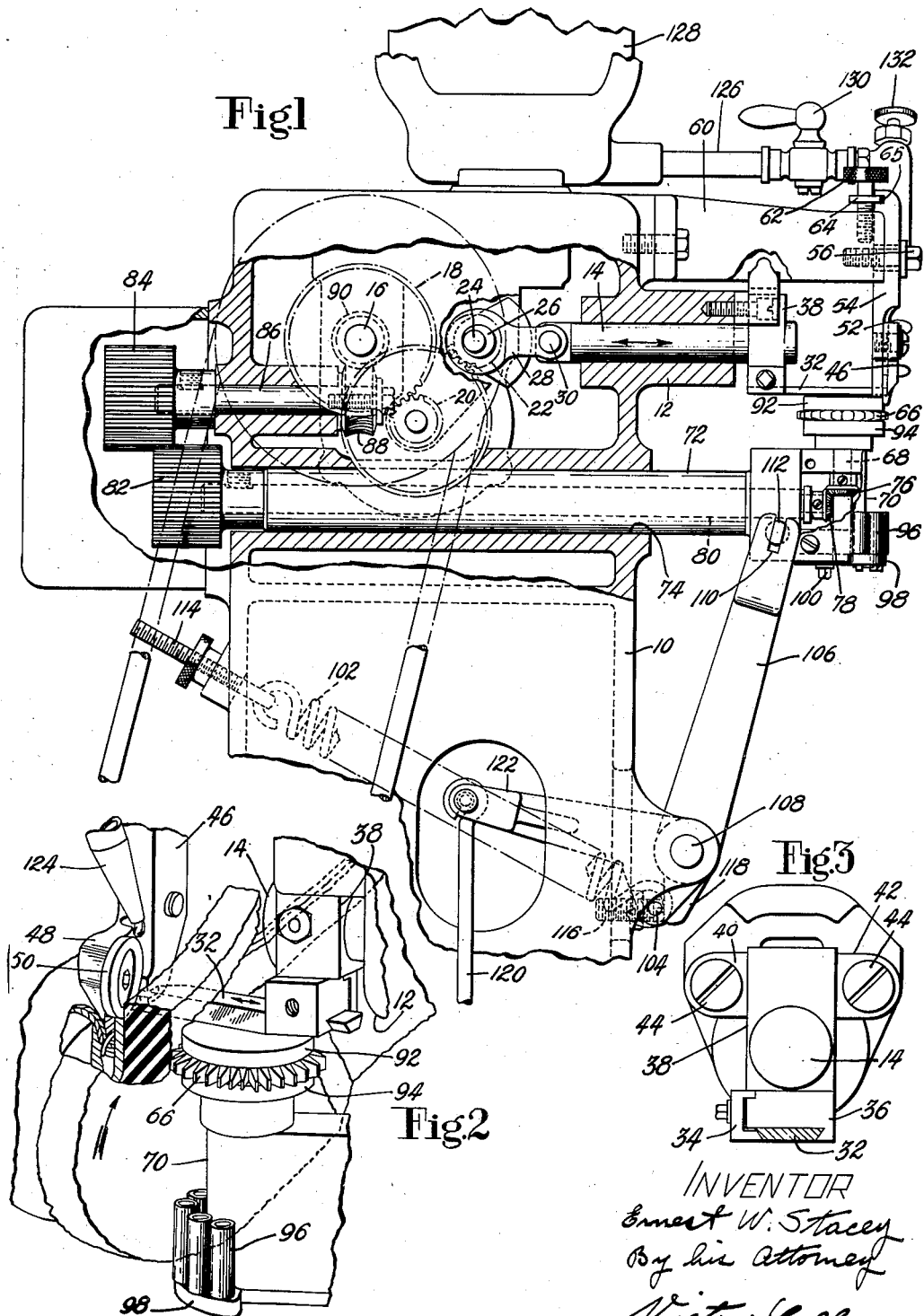
INVENTOR
Ernest W. Stacey
By his attorney
Victor Colb.

Patented Oct. 13, 1942

2,298,430

UNITED STATES PATENT OFFICE 2,298,430

TRIMMING MACHINE

Ernest W. Stacey, Beverly, Mass., assignor to United Shoe Machinery Corporation, Flemington, N. J., a corporation of New Jersey Application October 18, 1940, Serial No. 361,709

5 Claims. (Cl. 12—85)

This invention relates to trimming machines and more particularly to machines for trimming attached shoe soles made of crepe rubber or similar material.

The trimming of crepe rubber soles with a smooth even cut to the desired contour is in some respects more difficult than the trimming of soles made of other materials. Due to its soft resilient nature, the crepe rubber tends to be distorted upon movement of the knife through it, and by reason of this distortion of the material the actual line of cut, after the material resumes its undistorted condition, may deviate from the desired line and may be irregular, thus impairing the appearance of the finished shoe. This effect may be more pronounced if the trimming is done with a reciprocating knife which will tend to cause distortion alternately in opposite directions perpendicular to the plane of the sole.

The object of this invention is the provision of a machine for trimming crepe soles in which a sole is so supported and fed relatively to a trimming knife substantially to eliminate distortion of the rubber thereby insuring a smooth even cut of the desired contour. To this end and as a feature of the invention, a feed wheel is provided which has a toothed portion arranged to engage the sole inwardly of the line of cut, and, adjacent to this toothed portion, a smooth work-engaging member is located which resists distortion of the material during movement of the knife in one direction. The teeth of the feed wheel are so designed that they will indent or penetrate the sole to a sufficient depth to cause a positive feeding action without exerting any appreciable distortive effect on the rubber, and since the teeth are located inwardly of the line of cut, they do not compress or distort the rubber along the line of cut at all, whereas distortion of the material along this line by the motion of the knife is prevented by the work-engaging member positioned outwardly of the feed roll.

A guide roll is arranged to engage the perimeter of the welt and midsole of the shoe, the sole of which is being trimmed, and associated with this guide roll is a member which cooperates with the welt to maintain the sole against the feed roll and to prevent distortion of the crepe rubber upon movement of the knife toward the shoe.

In accordance with a further feature of the invention, suitable guiding means cooperate with the feed roll and the aforementioned work-engaging member to facilitate the maintenance of the proper vertical position of the sole.

These and other features of the invention will now be described in detail and illustrated in the drawing, in which:

Fig. 1 is a side elevation, partly in section, of one form of machine in which my invention may be embodied;

Fig. 2 is an angular view taken from the opposite side of the machine and on a larger scale than Fig. 1 showing the work-engaging members operating on a shoe; and Fig. 3 is a front elevation of the knife holder.

The machine is illustrated as comprising a housing 10 having in its front wall a bearing portion 12 for supporting a slidable knife operating shaft 14. The shaft 14 is arranged to be reciprocated at a high rate of speed by a drive shaft 16 which through gears 18, 20 and 22 causes rapid rotation of a shaft 24. The shaft 24 carries an eccentric 26 which is surrounded by a strap 28 connected by a pin 30 to the rear end of the shaft 14.

The shaft 14 carries at its forward end for reciprocation therewith a knife 32. The rear end of the knife is clamped between clamping members 34 and 36 (Fig. 3) on the lower end of a block 38 rigidly secured to the forward end of the shaft 14. The upper end of the block 38 moves in a slideway formed by members 40 and 42 which are secured by screws 44 to the front wall of the housing 10. This arrangement prevents any rotative movement of the block 38 relative to the shaft 14 so as to reduce to a minimum vibration of the knife 32 as it is reciprocated.

The forward end of the knife is supported against vertical movement by a recess formed in the lower end of an arm 46 (Fig. 2), the knife never moving completely out of the recess. The arm 46 has an extension 48 (Fig. 2) forming a welt guide on which is journaled a guide roll 50 arranged to engage the edge of the welt and midsole of a shoe to be trimmed for gaging the heightwise position of the shoe relative to the knife, thereby controlling the amount of material removed from the edge of the sole. The welt guide 48 extends downwardly to enter the crease between the welt and the upper, as clearly indicated in Fig. 2, to resist the thrust of the knife as it moves toward the left, as viewed in Fig. 2. The arm 46 is secured by a screw 52 to a downwardly extending arm 54 which is in turn adjustably secured by a screw 56 to a bracket 60 mounted on the front of the machine above the bearing member 12. A screw 62 threaded into the top wall of the bracket 60 carries a collar 64 which enters a recess 65 in the upper end of the arm 54 to adjust the heightwise position of the arm upon loosening of the screw 56.

The work is fed past the cutter 32 by a feed roll 66 mounted on a vertical shaft 68 supported in a casing 70 at the outer end of a sleeve 72. The sleeve 72 is slidably mounted in a bore 74 in the housing 10 so that the feed roll may be moved toward and away from the guide roll 50. The shaft 68 upon which the feed roll is mounted carries at its lower end a bevel gear 76 which meshes with a bevel gear 78 mounted on a shaft 80 journaled in the sleeve 72. The rear end of the shaft 80 carries a gear 82 having a hub portion engaging the rear end of the sleeve 72 so that the gear 82 and the shaft 80 will move axially with the sleeve. The gear 82 receives power from a gear 84 mounted on a shaft 86, the inner end of which carries a worm gear 88 meshing with a worm 90 on the drive shaft 16. Accordingly, rotation of the drive shaft causes rotation of the feed roll as well as reciprocatory movement of the knife 32.

The feed roll 66 is composed of a plurality of small radial teeth of a size and shape that will enable them easily to penetrate a crepe rubber sole. Above the feed roll is mounted coaxially therewith a disk 92 the diameter of which is less than that of the feed roll 66 so that the teeth of the feed roll will penetrate a substantial distance into the sole before engagement of the disk 92 with the sole. The plane in which the knife 32 reciprocates nearly coincides with the upper face of the disk 92 so that the sole is supported against distortion upon movement of the knife 32 to the right, as indicated in Fig. 2, from the point of engagement of the teeth of the feed roll 66 with the sole to the line of cut. The teeth of the feed roll are so shaped that they penetrate the sole to a sufficient depth to insure a positive feeding action without unduly distorting the material.

A disk 94 of substantially the same diameter as the disk 92 is mounted immediately below the feed roll 66 and cooperates with the disk 92 to assist in holding the sole at the proper angle relative to the knife during the trimming operation. Further to facilitate the holding of the sole at the proper angle, a plurality of rolls 96 mounted on an arm 98 secured by a screw 100 to the under side of the casing 70 are provided. These rolls extend upwardly around the front of the casing 70 and are substantially concentric with the feed roll 66 so that the shoe may be rocked about the casing 70 during the trimming operation. The rolls 96 engage the sole at the opposite edge from that along which the trimming is taking place, and one of these rolls will always be in engagement with the sole regardless of how the sole may be rocked relative to the casing 70.

The sleeve 72 is urged toward the right, as viewed in Fig. 1, so that the feed roll 66 will be maintained in tight engagement with a sole presented to the machine, the welt of which is held against the welt guide 48. The sleeve is urged in this direction by a spring 102 secured to a pin 104 mounted on a downward extension of an arm 106 pivoted at 108 to the front of the housing 10. The upper end of the arm 106 is slotted at 110 to receive a pin 112 mounted in the casing 70. The rear end of the spring 102 is adjustably secured to the rear end of the housing 10 by a screw 114. The spring 102 acts to move the arm 106 in a clockwise direction, as viewed in Fig. 1, thereby causing movement of the sleeve 72 and the feed roll 66 to the right. Such movement is limited when no shoe is in the machine, by a stop screw 116 threaded in the front of the housing 10 and engaging a downwardly extending portion 118 of the arm 106. The arm 106 may be moved to retract the feed roll 66 against the force exerted by the spring 102 by downward movement of a treadle rod 120, the upper end of which is connected to an arm 122 rigid with the arm 106.

A nozzle 124 is positioned to drip a liquid lubricant on the outer end of the knife, this nozzle being connected by a pipe 126 to a reservoir 128 mounted on top of the machine. A shut-off cock 130 and a needle valve 132 control the flow of lubricant to the nozzle.

In the operation of the machine, the treadle rod 120 is moved downwardly to retract the feed roll 66 and permit presentation of a shoe to the machine. The shoe is presented to the machine with the welt and midsole in engagement with the guide roll 50 and with the lower end of the welt guide 48 in the crease between the welt and the upper. The height-wise position of the shoe in the machine is thus determined and the treadle is now released to permit movement of the feed roll 66 toward the shoe under the force exerted by the spring 102. The teeth of the feed roll will penetrate the sole until the disks 92 and 94 move into engagement with the sole, whereupon the shoe will be fed through the machine and the knife 32, which is reciprocated at high speed, will trim off the excess material extending outwardly from the midsole and welt. Distortion of the rubber along the line of trimming is prevented by the disk 92 and the welt guide 48 which also maintains the shoe in engagement with the feed roll 66. Since the material is thus held against distortion during the trimming operation, a smooth, even cut of the desired contour is readily obtained.

Having thus described my invention, what I claim as new and desire to secure by Letters Patent of the United States is:

1. In a machine for trimming the edge of a piece of sheet material, a driven feed roll having a toothed periphery constructed and arranged to penetrate the material to a substantial depth inwardly of the edge thereof, a cylindrical smooth-surfaced member at one end of the feed roll, the diameter of which is less than the diameter of the feed roll but great enough to engage the material without distorting it when the teeth of the feed roll have penetrated the material, and trimming means arranged at the end of the cylindrical member remote from said feed roll for trimming surplus stock from the edge of the material as it is fed.

2. In a machine for trimming the edge of a piece of resilient sheet material, a driven feed roll having a toothed periphery constructed and arranged to penetrate the material to a substantial depth inwardly of the edge thereof, a pair of smooth-surfaced cylindrical members at opposite ends of said feed roll, the diameters of said members being less than that of the feed roll but great enough to engage the material without distorting it when the teeth of the feed roll have penetrated the material, and trimming means arranged at the end of one of said cylindrical members remote from said feed roll for trimming surplus stock from the edge of the material as it is fed.

3. In a crepe sole trimming machine, a driven feed roll having a toothed periphery constructed and arranged to penetrate the tread surface of a sole inwardly of the edge thereof, cylindrical members flanking said feed roll, the diameters of said cylindrical members being less than that of the feed roll but great enough to engage the sole without distorting it when the teeth of the feed roll have penetrated the sole, a welt guide, resilient means causing relative movement of the feed roll and welt guide to clamp the sole therebetween, a knife reciprocable across the outer surface of one of said cylindrical members, and means for reciprocating said knife to trim the surplus stock from the edge of the sole as it is fed.

4. In a crepe sole trimming machine, a feed roll arranged for rotation about a substantially vertical axis, a support for said feed roll, transmission means in said support by which said feed roll is driven, and a plurality of guide rolls arranged side by side in concentric relation to said feed roll and mounted on the outside of said support.

5. In a crepe sole trimming machine, a feed roll having teeth arranged to penetrate the surface of a sole, a work-engaging disk above said feed roll, said disk being of smaller diameter than said feed roll, a knife movable across the upper surface of said disk for trimming surplus material from the edge of a sole, means against which the sole is held by said feed roll and said disk, a second work-engaging disk below said feed roll and being of substantially the same diameter as that of the first-named disk, a casing supporting said feed roll and disks, power transmission means within said casing for causing rotation of said feed roll, and a plurality of guide rolls spaced below said second disk and mounted around the outside of said casing, said guide rolls being arranged side by side in concentric relation to said feed roll.

ERNEST W. STACEY.